(12) United States Patent
Ollila et al.

(10) Patent No.: US 8,358,924 B2
(45) Date of Patent: Jan. 22, 2013

(54) METHOD AND APPARATUS FOR OPERATING THE AUTOMATIC FOCUS OR THE OPTICAL IMAGING STABILIZING SYSTEM

(75) Inventors: Mikko Antti Ollila, Tampere (FI); Marko Juhani Eromaki, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/645,439

(22) Filed: Dec. 22, 2009

(65) Prior Publication Data
US 2011/0150441 A1 Jun. 23, 2011

(51) Int. Cl.
*G03B 17/00* (2006.01)
*H02K 41/02* (2006.01)

(52) U.S. Cl. ........................ 396/55; 310/12.14

(58) Field of Classification Search ............. 396/55, 396/427, 428; 310/12.03, 12.14, 12.16, 12.21, 310/12.22, 21
See application file for complete search history.

(56) References Cited

U.S. PATENT DOCUMENTS

| 7,355,630 | B2 | 4/2008 | Uenaka et al. ............ 348/208.2 |
| 7,411,625 | B2 | 8/2008 | Lee et al. ...................... 348/361 |
| 2006/0098098 | A1* | 5/2006 | Seo ......................... 348/208.99 |
| 2006/0228099 | A1 | 10/2006 | Chiang ......................... 396/133 |
| 2007/0247539 | A1* | 10/2007 | Ho et al. ...................... 348/335 |
| 2008/0198462 | A1* | 8/2008 | Sekino ......................... 359/557 |
| 2009/0103195 | A1 | 4/2009 | Tsai ............................. 359/824 |
| 2010/0098394 | A1* | 4/2010 | Ishihara et al. ................ 396/55 |
| 2010/0329654 | A1* | 12/2010 | Chiang .......................... 396/55 |

FOREIGN PATENT DOCUMENTS
EP 1 795 944 A1 6/2007
WO WO-2005/084013 A1 9/2005

\* cited by examiner

*Primary Examiner* — Clayton E Laballe
*Assistant Examiner* — Noam Reisner
(74) *Attorney, Agent, or Firm* — Harrington & Smith (57) ABSTRACT

In accordance with an example embodiment of the present invention, an apparatus, comprising a printed wiring board. The printed wiring board comprising a coil and being coupled to an image sensor. Further, the coil, using the magnetic circuitry, is designed to tilt the printed wiring board and automatic focus optomechanics, the automatic focus optomechanics being attached to the printed wiring board over at least one of: a pivot point and a tilting axis to operate an optical imaging stabilizing system. Moreover, a second coil is designed to interact with the magnetic circuitry to move the lens barrel at least one of closer and farther from the image sensor to perform an automatic focus.

20 Claims, 10 Drawing Sheets

METHOD AND APPARATUS FOR OPERATING THE AUTOMATIC FOCUS OR THE OPTICAL IMAGING STABILIZING SYSTEM

TECHNICAL FIELD

The present application relates generally to operating the automatic focus or the optical imaging stabilizing system.

BACKGROUND

A digital camera is a camera that takes video or still photographs, or both, digitally by recording images via an electronic image sensor. Digital cameras are incorporated into many devices ranging from personal data assistants and mobile phones to vehicles. In this way, digital camera may be used by many.

SUMMARY

Various aspects of examples of the invention are set out in the claims.

According to a first aspect of the present invention, an apparatus, comprising a printed wiring board. The printed wiring board comprising a coil and being coupled to an image sensor. Further, the coil, using the magnetic circuitry, is designed to tilt the printed wiring board and automatic focus optomechanics, the automatic focus optomechanics being attached to the printed wiring board over at least one of: a pivot point and a tilting axis to operate an optical imaging stabilizing system. Moreover, a second coil is designed to interact with the magnetic circuitry to move the lens barrel at least one of closer and farther from the image sensor to perform an automatic focus.

According to a second aspect of the present invention, a method comprises interacting with magnetic circuitry using one or more coils, moving the printed wiring board to move the optical imaging stabilizing system using the magnetic circuitry, interacting with magnetic circuitry using a second coil, and moving a lens barrel to perform an automatic focus using the magnetic circuitry.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 6 of the drawings.

Figure 1:
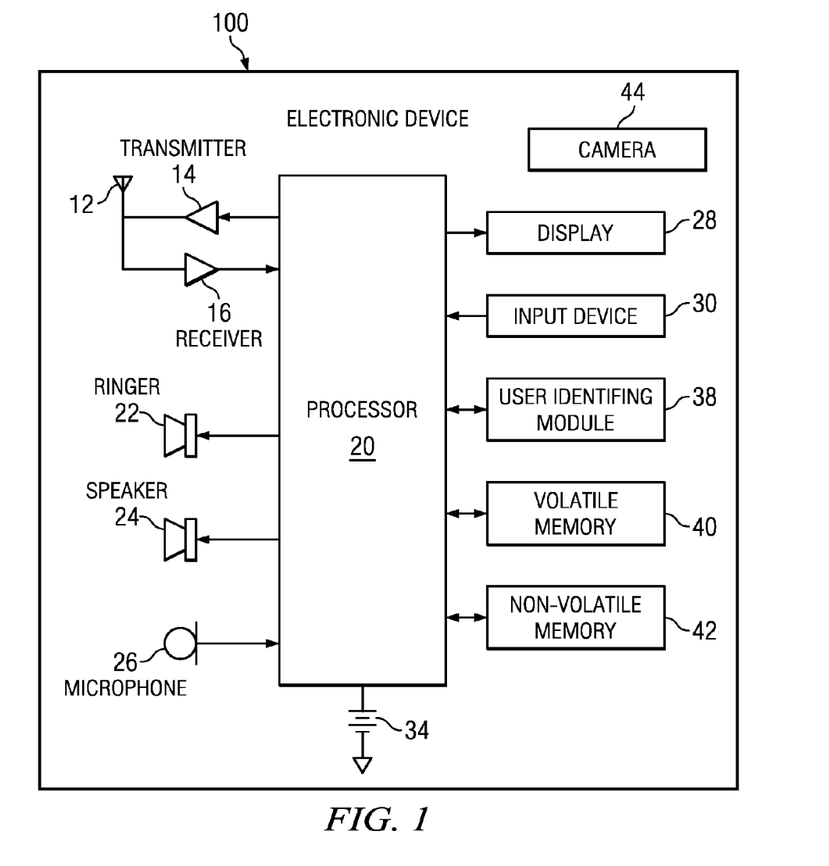
FIG. 1 is a block diagram depicting an electronic device operating in accordance with an example embodiment of the invention.

FIG. 1 is a block diagram depicting an electronic device 100 operating in accordance with an example embodiment of the invention. In an example embodiment, an electronic device 100 comprises at least one antenna 12 in communication with a transmitter 14, a receiver 16, and/or the like. The electronic device 100 may further comprise a processor 20 or other processing component. In an example embodiment, the electronic device 100 may comprises multiple processors, such as processor 20. The processor 20 may provide at least one signal to the transmitter 14 and may receive at least one signal from the receiver 16. In an embodiment, the electronic device 100 may also comprise a user interface comprising one or more input or output devices, such as a conventional earphone or speaker 24, a ringer 22, a microphone 26, a display 28, and/or the like. In an embodiment, an input device 30 comprises a mouse, a touch screen interface, a pointer, and/or the like. In an embodiment, the one or more output devices of the user interface may be coupled to the processor 20. In an example embodiment, the display 28 is a touch screen, liquid crystal display, and/or the like.

In an embodiment, the electronic device 100 may also comprise a battery 34, such as a vibrating battery pack, for powering various circuits to operate the electronic device 100. Further, the vibrating battery pack may also provide mechanical vibration as a detectable output. In an embodiment, the electronic device 100 may further comprise a user identity module (UIM) 38. In one embodiment, the UIM 38 may be a memory device comprising a processor. The UIM 38 may comprise, for example, a subscriber identity module (SIM), a universal integrated circuit card (UICC), a universal subscriber identity module (USIM), a removable user identity module (R-UIM), and/or the like. Further, the UIM 38 may store one or more information elements related to a subscriber, such as a mobile subscriber.

In an embodiment, the electronic device 100 may comprise memory. For example, the electronic device 100 may comprise volatile memory 40, such as random access memory (RAM). Volatile memory 40 may comprise a cache area for the temporary storage of data. Further, the electronic device 100 may also comprise non-volatile memory 42, which may be embedded and/or may be removable. The non-volatile memory 42 may also comprise an electrically erasable programmable read only memory (EEPROM), flash memory, and/or the like. In an alternative embodiment, the processor 20 may comprise memory. For example, the processor 20 may comprise volatile memory 40, non-volatile memory 42, and/or the like.

In an embodiment, the electronic device 100 may use memory to store any of a number of pieces of information and/or data to implement one or more features of the electronic device 100. Further, the memory may comprise an identifier, such as international mobile equipment identification (IMEI) code, capable of uniquely identifying the electronic device 100. The memory may store one or more instructions for determining cellular identification information based at least in part on the identifier. For example, the processor 20, using the stored instructions, may determine an identity, e.g., cell id identity or cell id information, of a communication with the electronic device 100.

In an embodiment, the processor 20 of the electronic device 100 may comprise circuitry for implementing audio feature, logic features, and/or the like. For example, the processor 20 may comprise a digital signal processor device, a microprocessor device, a digital to analog converter, other support circuits, and/or the like. In an embodiment, control and signal processing features of the processor 20 may be allocated between devices, such as the devices described above, according to their respective capabilities. Further, the processor 20 may also comprise an internal voice coder and/or an internal data modem. Further still, the processor 20 may comprise features to operate one or more software programs. For example, the processor 20 may be capable of operating a software program for connectivity, such as a conventional Internet browser. Further, the connectivity program may allow the electronic device 100 to transmit and receive Internet content, such as location-based content, other web page content, and/or the like.

In an embodiment, the electronic device 100 may use a wireless application protocol (WAP), hypertext transfer protocol (HTTP), file transfer protocol (FTP) and/or the like to transmit and/or receive the Internet content.

In an embodiment, the electronic device 100 may be capable of operating in accordance with any of a number of a first generation communication protocol, a second generation communication protocol, a third generation communication protocol, a fourth generation communication protocol, and/or the like. For example, the electronic device 100 may be capable of operating in accordance with second generation (2G) communication protocols IS-136, time division multiple access (TDMA), global system for mobile communication (GSM), IS-95 code division multiple access (CDMA), and/or the like. Further, the electronic device 100 may be capable of operating in accordance with third-generation (3G) communication protocols, such as Universal Mobile Telecommunications System (UMTS), CDMA2000, wideband CDMA (WCDMA), time division-synchronous CDMA (TD-SCDMA), and/or the like. Further still, the electronic device 100 may also be capable of operating in accordance with 3.9 generation (3.9G) wireless communication protocols, such as Evolved Universal Terrestrial Radio Access Network (E-UTRAN) or the like, or wireless communication projects, such as long term evolution (LTE) or the like. Still further, the electronic device 100 may be capable of operating in accordance with fourth generation (4G) communication protocols.

In an alternative embodiment, the electronic device 100 may be capable of operating in accordance with a non-cellular communication mechanism. For example, the electronic device 100 may be capable of communication in a wireless local area network (WLAN), other communication networks, and/or the like. Further, the electronic device 100 may communicate in accordance with techniques, such as radio frequency (RF), infrared (IrDA), any of a number of WLAN techniques. For example, the electronic device 100 may communicate using one or more of the following WLAN techniques: IEEE 802.11, e.g., 802.11a, 802.11b, 802.11g, 802.11n, and/or the like. Further, the electronic device 100 may also communicate, via a world interoperability, to use a microwave access (WiMAX) technique, such as IEEE 802.16, and/or a wireless personal area network (WPAN) technique, such as IEEE 802.15, BlueTooth (BT), ultra wideband (UWB), and/or the like.

It should be understood that the communications protocols described above may employ the use of signals. In an example embodiment, the signals comprises signaling information in accordance with the air interface standard of the applicable cellular system, user speech, received data, user generated data, and/or the like. In an embodiment, the electronic device 100 may be capable of operating with one or more air interface standards, communication protocols, modulation types, access types, and/or the like. It should be further understood that the electronic device 100 is merely illustrative of one type of electronic device that would benefit from embodiments of the invention and, therefore, should not be taken to limit the scope of embodiments of the invention.

While embodiments of the electronic device 100 are illustrated and will be hereinafter described for purposes of example, other types of electronic devices, such as a portable digital assistant (PDA), a pager, a mobile television, a gaming device, a camera 44, such as a charge-coupled device, complementary metal oxide semiconductor, and/or the like, based at least in part on a camera for image recording, a video recorder, an audio player, a video player, a radio, a mobile telephone, a traditional computer, a portable computer device, a global positioning system (GPS) device, a GPS navigation device, a GPS system, a mobile computer, a browsing device, an electronic book reader, a combination thereof, and/or the like, may be used. While several embodiments of the invention may be performed or used by the electronic device 100, embodiments may also be employed by a server, a service, a combination thereof, and/or the like.

Figure 2A:
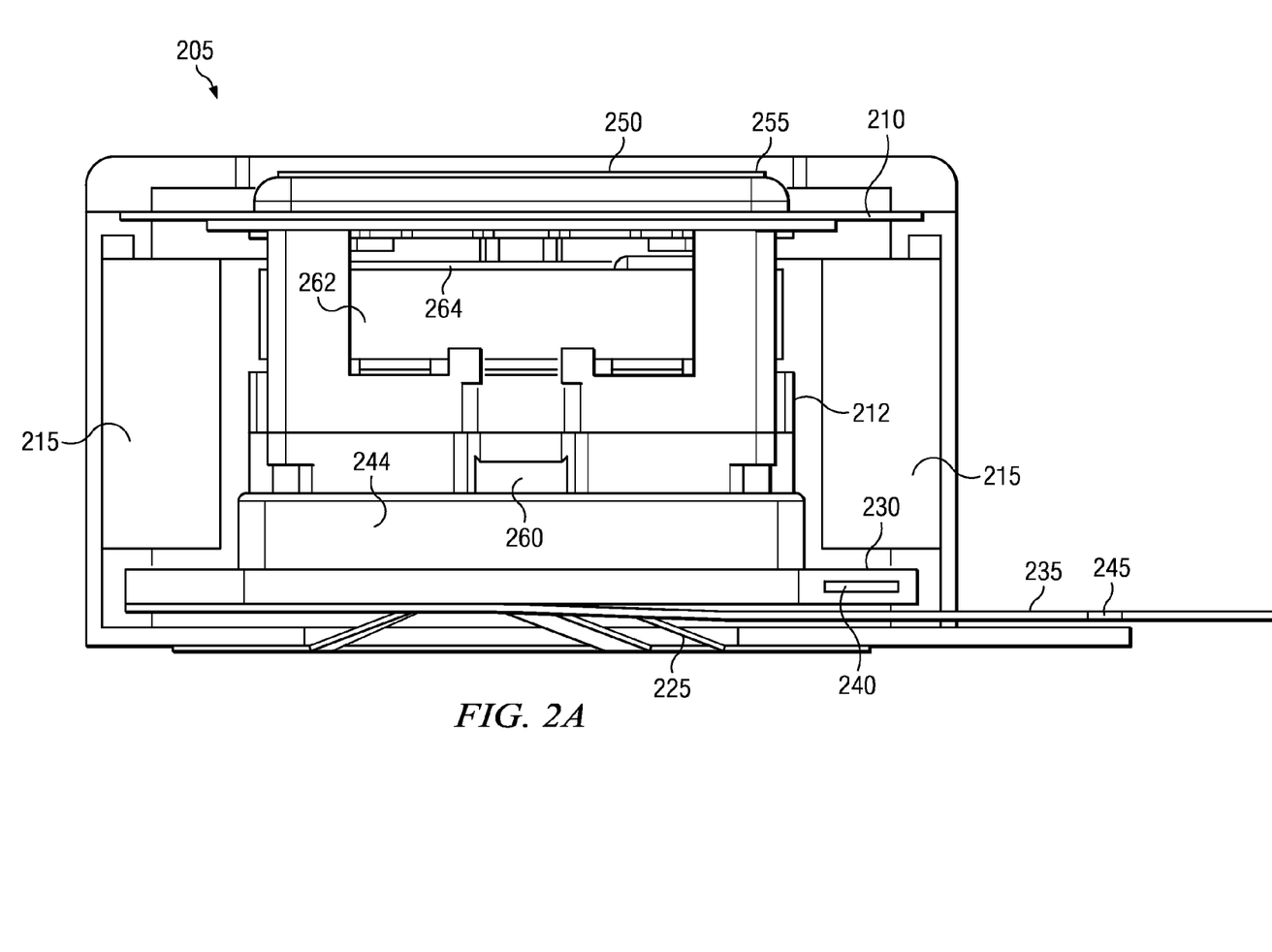
FIG. 2A is a block diagram depicting a camera operating in accordance with an example embodiment of the invention.

FIG. 2A is a block diagram depicting a camera 205 operating in accordance with an example embodiment of the invention. In an example embodiment, the camera 205 is similar to camera 44 of FIG. 1. In an alternative embodiment, the camera 205 is different than camera 44 of FIG. 1. It should be understood that the camera 205 may be separate and/or part of an electronic device, such as electronic device 100 of FIG. 1.

In an example embodiment, the camera 205 comprises an upper spring 210, a lower spring 225, suspension 212, magnetic circuitry 215, a printed wiring board 230, a flexible printed circuit 235, an optical imaging stabilizing system 250, an automatic focus 255, an image sensor 260, and/or the like. In an embodiment, the printed wiring board 230 comprises a coil 240. In an embodiment, the printed wiring board 230 is a camera printed wiring board.

In an example embodiment, the automatic focus 255 is configure to use contrast sensors within the camera 205, e.g., a passive automatic focus, or by sending out a signal to illuminate or estimate distance to the subject, such as an active automatic focus. In an example embodiment, the flexible printed circuit 235 comprises a coil 245. It should be understood that the location of one or more coils 240, 245 may be in the printed wiring board 230, flexible printed circuit 235, a combination thereof, or in another suitable location.

In example embodiment, the image sensor 260 is mounted or otherwise attached to the printed wiring board 230. In an embodiment, the image sensor 260 is a device that converts an optical image to an electric signal. In an embodiment, the image sensor 260 detects optical information and generates electronic signals corresponding to the optical information. In an embodiment, the image sensor 260 is at least one of a charge-coupled device (CCD) or a complementary metal-oxide-semiconductor (CMOS) active-pixel sensor.

In an embodiment, the optical imaging stabilizing system 250 comprises one or more lens. Further, the optical imaging stabilizing system 250 is configured to optically communicate with the image sensor 260 to, for example, capture images. In an embodiment, the optical imaging stabilizing system 250 comprises one or more optical components configured to optically communicate with the image sensor 260 to capture images. In an embodiment, the optical imaging stabilizing system 250 comprises a focusing lens unit, a filter, and/or the like. In an example embodiment, the focusing lens unit includes a first lens, a second lens, a third lens, and/or the like. It should be understood that the focusing lens unit is only an example and any number of lens, such as one, two, four, and so on may be used to employ example embodiments of the invention.

In an embodiment, the first lens, the second lens, the third lens and the filter are received in a lens barrel 264 in the order written from the first end to the second end of the lens barrel 264 along a central axis of the lens barrel 264. The filter is configured to allow light in the visible spectrum passing there through while blocking light in the infrared/ultraviolet spectrum and is used to prevent interference from infrared/ultraviolet radiation. Further, a number of spacers are disposed between two neighboring optical components, for example, between the first lens and the second lens, between the second lens and the third lens, and between the third lens and the filter. Each of the spacers is configured to separate the two neighboring optical components, thereby forming a space there between.

In an embodiment, a control unit of the camera 205 electrically is configured to connect to the power of magnetic circuitry 215, and electrically connect to the image sensor 260 via the printed wiring board 230. The control unit is configured to receive the electronic signals from the image sensor 260, changing the magnetic polarities of magnetic force generation system formed by the magnetic circuitry 215 and coil 240 to create a combined magnetic torsional force and thereby causing a force on coil 240 that makes the printed wiring board 230 of the camera 205 to tilt over pivot point based at least in part on the received electronic signals.

In an example embodiment, the coil 240 is positioned substantially inside the magnetic field of magnetic circuitry 215. In such a case, there is electrical current through the coil 240 and the coil 240 experiences force, such as a Lorentz force, that moves the lens barrel 264. In an example embodiment, the force works against a bias spring. The bias force of spring may keep the lens barrel 264 at infinity. When current is increased the increasing Lorentz force presses the spring and moves the lens barrel 264. Consider the following example. When a wire carrying an electrical current is placed in a magnetic field, each of the moving charges, which comprise the current, experiences the Lorentz force, and together they can create a macroscopic force on the wire, sometimes referred to as the Laplace force. By combining the Lorentz force with the definition of electrical current, the following equation results, in the case of a straight, stationary wire:

$$F = IL \times B$$

where
F=Force, measured in newtons
I=current in wire, measured in amperes
B=magnetic field vector, measured in teslas
$\times$=vector cross product
L=a vector, whose magnitude is the length of wire, e.g., measured in meters, and whose direction is along the wire, aligned with the direction of conventional current flow.

In an embodiment, the control unit of the camera 205 comprises processing circuitry, a driving circuitry, and/or the like. In an embodiment, the processing circuitry is configured to process the electronic signals from the image sensor 260, thereby obtaining a result regarding a movement direction and a movement distance of the optical imaging stabilizing system 250. In an example embodiment, the driving circuitry is configured to control the direction of the electric current flowing in, for example, the coil 240, thereby changing the magnetic polarities of the corresponding magnetic circuitry 215.

In an example embodiment, the printed wiring board 230 comprises a coil 240. Further, the printed wiring board 230 is coupled to the image sensor 260. In such a case, the coil 240 using the magnetic circuitry 215 is designed to tilt the printed wiring board 230 and automatic focus optomechanics 244, the automatic focus optomechanics 244 being attached to the printed wiring board 230 over at least one of: a pivot point and a tilting axis to operate an optical imaging stabilizing system 250. For example, the coil 240 using the magnetic circuitry 215 to move the printed wiring board 230. Further, a second coil 262 is designed to interact with the magnetic circuitry to move the lens barrel 264 at least one of closer and farther from the image sensor to perform an automatic focus of the automatic focus 250.

In an example embodiment, an automatic focus coil 262 is wound around a lens barrel 264 of the automatic focus optomechanics 255. In such a case, the focusing coil 262 interacts with the magnetic circuitry 215 to move the lens barrel 264 along an optical axis inside the automatic focus optomechanics 244 to perform focusing of image 255. Further, the coil 240 or coil 245 associated with the printed wiring board 230 interacts with the magnetic circuitry 215 to tilt the optical imaging stabilizing system 250, e.g., a lens barrel. Further still, tilting of the printed wired board 230 and/or parts attached to the printed wired board 230, the image sensor 260, automatic focus optomechanics 244, and/or the like, provides image stabilization and movement of lens barrel along the optical axis and provides auto focusing. It should be understood that the movement of the lens barrel 264 to perform an automatic focus 255 and the tilting of the printed wired board 230 to operate an optical imaging stabilizing system may occur simultaneous or independent of each other.

A technical effect of one or more of the example embodiments disclosed herein is a high performance optical stabilization effect which is achieved with camera tilt principle by using tilting the printed wiring board. Another technical effect of one or more of the example embodiments disclosed herein is by using a shared actuation system between autofocus and stabilization, one skilled in the art may employ the modular structure which from core camera technology without the cost and productional benefit. Another technical effect of one or more of the example embodiments disclosed herein is by using existing technology for operating the automatic focus and/or optical imaging stabilizing system larger optical and/or enhancing lens may be used due to the conservation in space.

Figure 2B:
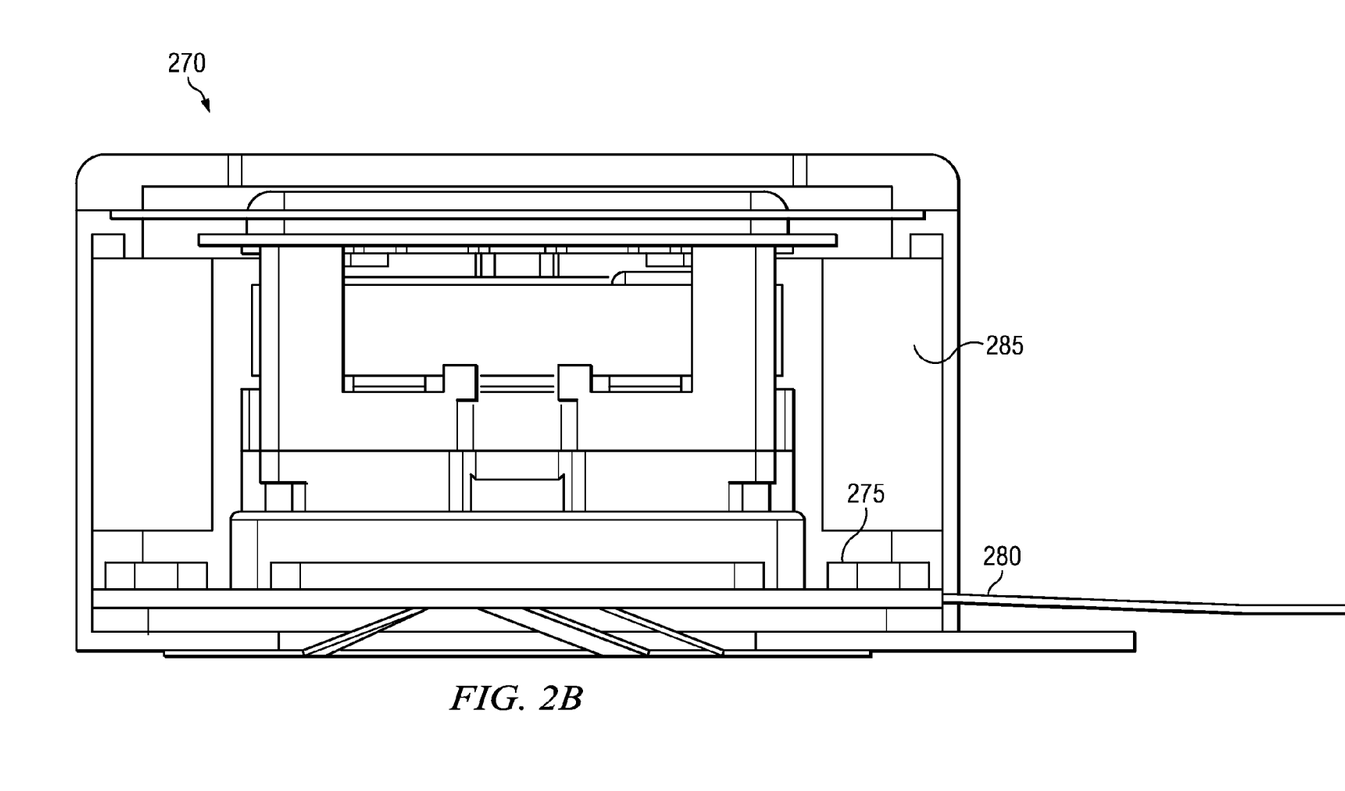
FIG. 2B is a block diagram depicting another camera operating in accordance with an example embodiment of the invention.

FIG. 2B is a block diagram depicting another camera 270 operating in accordance with an example embodiment of the invention. In an example embodiment, the camera 270 is similar to camera 44 of FIG. 1 or camera 205 of FIG. 2A. In an alternative embodiment, the camera 270 is different than camera 44 of FIG. 1 and/or camera 205 of FIG. 2A. It should be understood that the camera 270 may be separate and/or part of an electronic device, such as electronic device 100 of FIG. 1.

In an example embodiment, camera 270 comprises, in part, one or more coils 275, magnetic circuitry 285, and a rigid flexible printed circuit 280. In example embodiment, the rigid flexible printed circuit 280 comprises a rigid portion and one or more flexible printed circuit boards. In an embodiment, the one or more flexible printed circuits are non-detachably connected together. In an alternative embodiment, the one or more flexible printed circuits are detachably connected together. Further, the rigid portion may comprise one or more layers. Further still, the flexible portion may have fewer layers than the rigid portion and vice versa. It should be understood that any number of layers may be used for the rigid portion and/or the flexible portion.

Figure 2C:
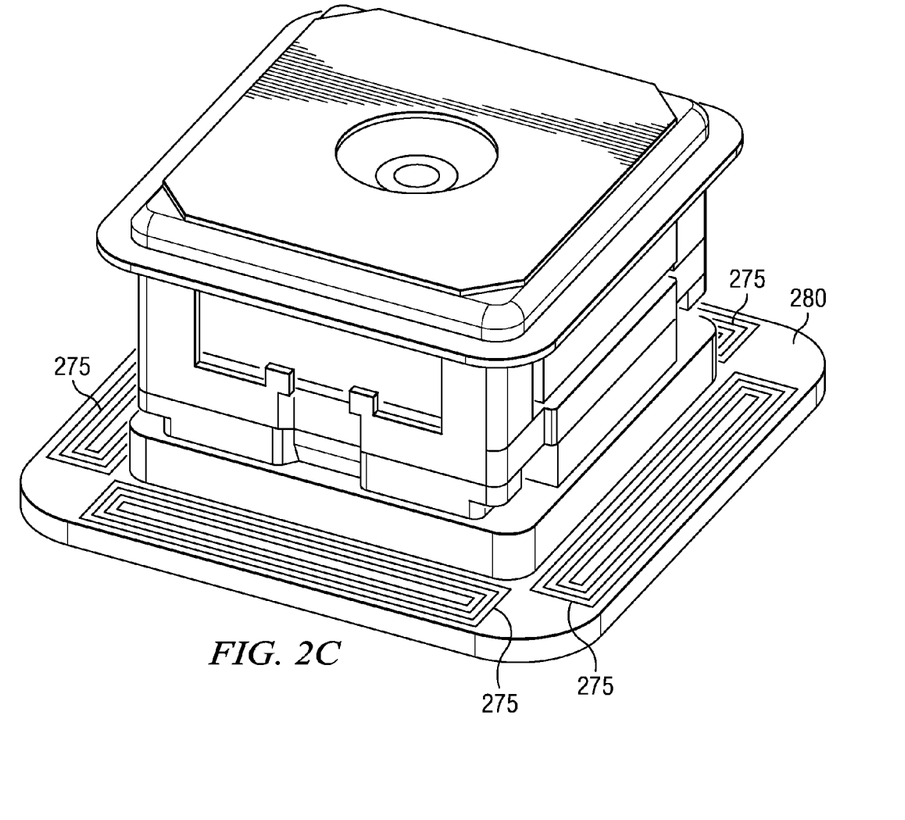
FIG. 2C is a block depicting a partial top view of the camera of FIG. 2B operating in accordance with an example embodiment of the invention.
Figure 2D:
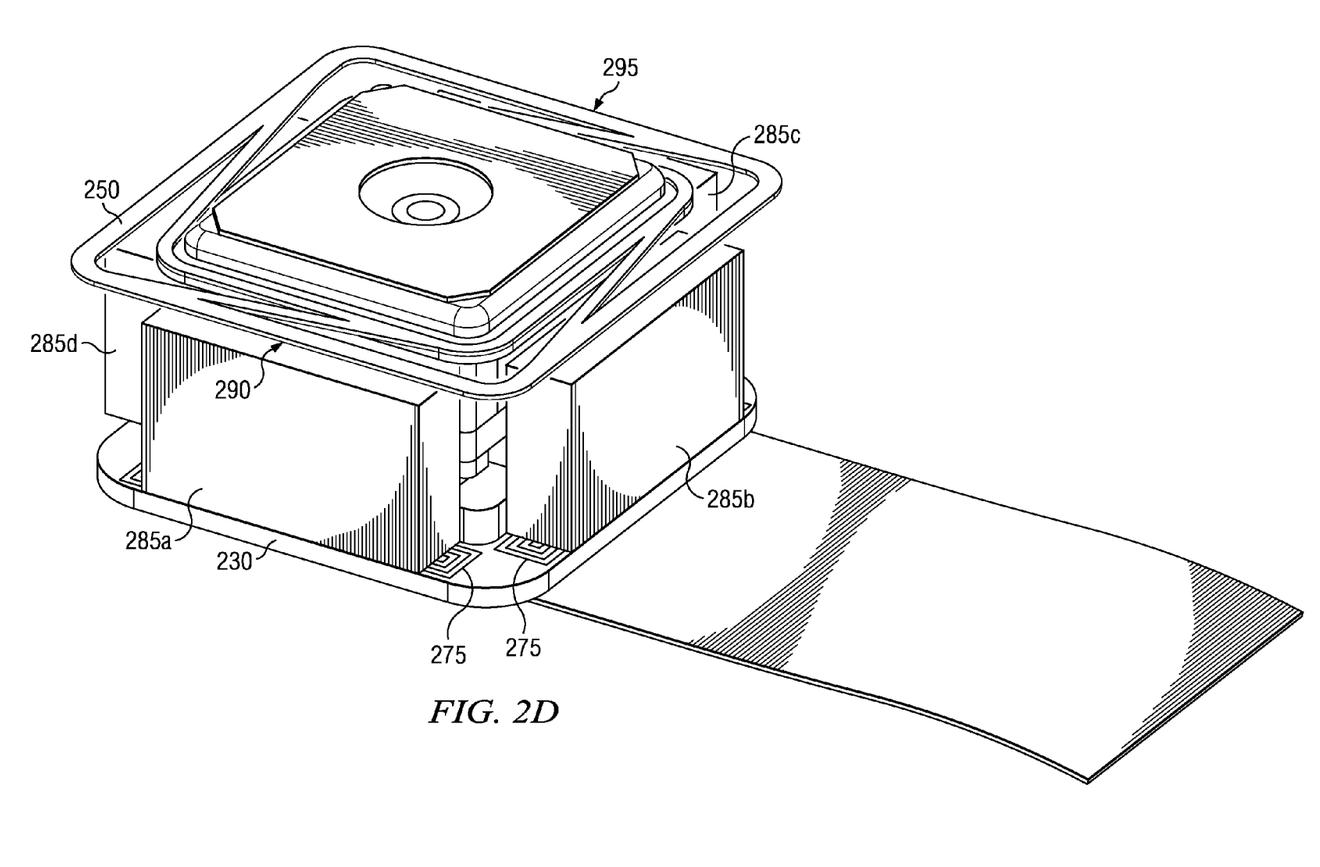
FIG. 2D is a block depicting a partial side view of the camera of FIG. 2B operating in accordance with an example embodiment of the invention.

In an example embodiment, the one or more coils 275 are position around a moving lens group inside the camera 270. In such a case, the rigid flexible printed circuit 280 allows for a better conductive connection to a main board of the camera. Further, the rigid flexible printed circuit 280 may be positioned under an image sensor, such as image sensor 260 of FIG. 2A, and as use the one or more coils 275 as a base. In such a case, a flexible portion of the rigid flexible printed circuit 280 is used for the connection. It should be understood that the coils 275 may be constructed using a laminated layer of wiring within a substrate, post assembled on top of a substrate, and/or the like. Other designs are also possible. In an example embodiment, the one or more coils 275, using the rigid flexible printed circuit 280 tilt the flexible printed circuit 280 to operate an optical imaging stabilizing system, such as optical imaging stabilizing system 250 of FIG. 2A. Consider the following example in reference to FIGS. 2C-2D FIG. 2C is a block depicting a partial top view of camera 270 of FIG. 2B operating in accordance with an example embodiment of the invention. In particular, the one or more coils 275 are shown on the flexible printed circuit 280. An optical imaging stabilizing system and/or automatic focus components may be connected to the flexible printed circuit 280. In an embodiment, the one or more coils 275 interact with magnetic circuitry, such as magnetic circuitry 280, to operate an optical imaging stabilizing system 250, such as optical imaging stabilizing system 250 of FIG. 2A. FIG. 2D is illustrative.

Figure 3:
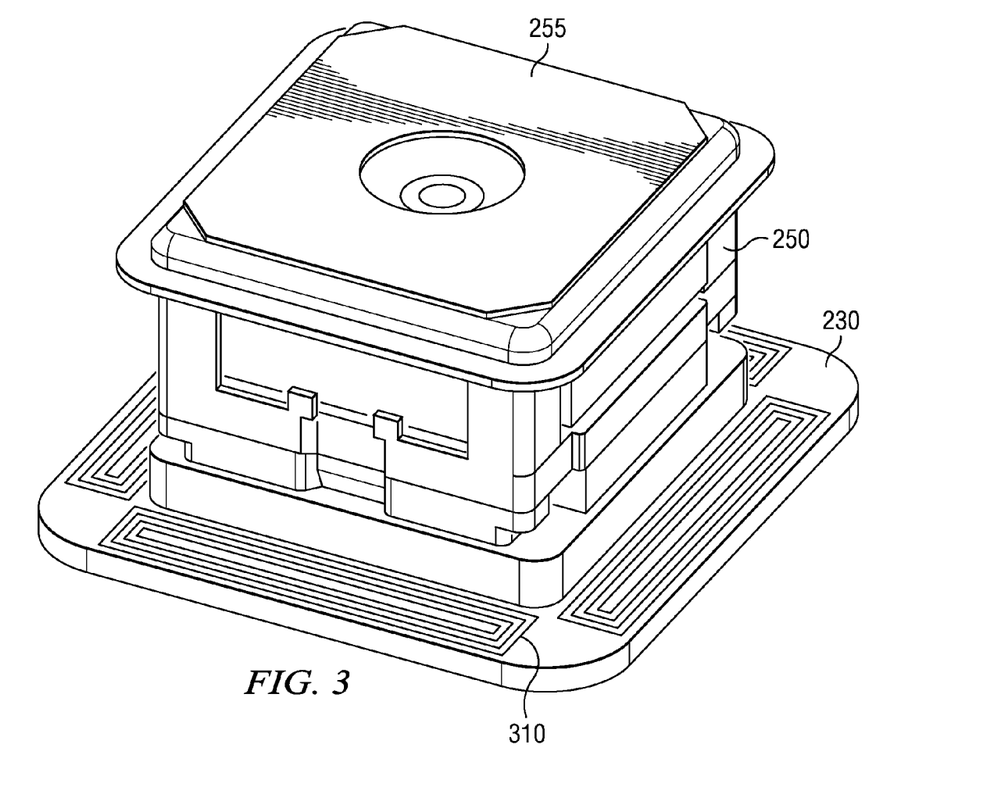
FIG. 3 is a block diagram depicting a printed wiring board, automatic focus, and optical imaging stabilizing system in accordance with an example embodiment of the invention.

FIG. 2D is a block depicting a partial side view of camera 270 of FIG. 2B operating in accordance with an example embodiment of the invention. In an example embodiment, the one or more coils 275 interact with magnetic circuitry 285a, b. In particular, by changing the magnetic polarities of magnetic force generation system formed by the magnetic circuitry 215 and the one or more coils 275 to create a combined magnetic torsional force and thereby causing a force on the one or more coils 275 that makes the printed wiring board 230 of the camera 270 to tilt over a pivot point based at least in part on the received electronic signals FIG. 3 is a block diagram depicting a printed wiring board, automatic focus, and optical imaging stabilizing system in accordance with an example embodiment of the invention. In an example embodiment, the automatic focus 255, printed wiring board 230, and/or optical imaging stabilizing system 250 are part of a camera similar to camera 44 of FIG. 1 or camera 205 of FIG. 2. In an alternative embodiment, the automatic focus 255, printed wiring board 230, and/or optical imaging stabilizing system 250 are part of a camera different than camera 44 of FIG. 1 or camera 205 of FIG. 2.

In an example embodiment, the automatic focus 255, optical imaging stabilizing system 250, and printed wiring board 230 to tilt the automatic focus 255 and/or optical imaging stabilizing system 250 using the coil. In an embodiment, the coil comprises fine pitch embedded coils 310. Further, the coil is adapted to interact with the automatic focus using the magnetic circuitry. For example, the automatic focus focuses based at least in part by interaction with a coil inductor around one or more lens barrels and the magnet circuitry.

Figure 4:
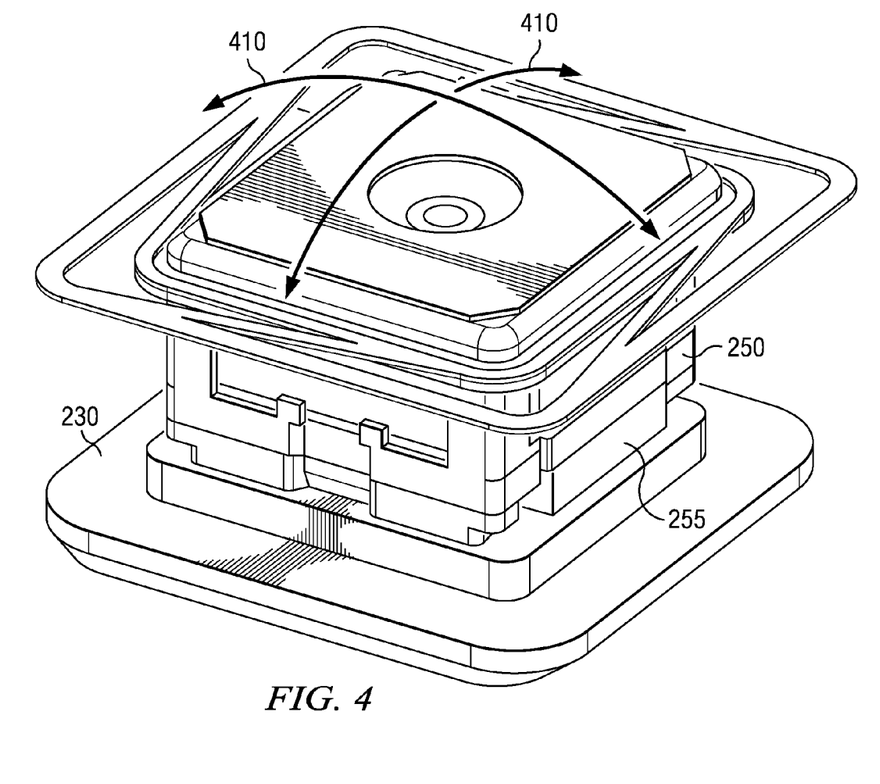
FIG. 4 is a side view of the automatic focus and optical imaging stabilizing system in accordance with an example embodiment of the invention.

FIG. 4 is a side view of the automatic focus 255 and optical imaging stabilizing system 250 in accordance with an example embodiment of the invention. In an example embodiment, the automatic focus 255 and/or printed wiring board 230 are part of a camera similar to camera 44 of FIG. 1 or camera 205 of FIG. 2. In an alternative embodiment, the automatic focus 255 and/or printed wiring board 230 are part of a camera different than camera 44 of FIG. 1 or camera 205 of FIG. 2.

In an example embodiment, the automatic focus 255 is removed and a coil is extended outside the automatic focus in such a manner so as not to affect sensors and/or optics. Further, a printed wiring board 230 is extended and the printed wiring board 230 comprises fine pitch coils. In such a case, the automatic focus 255 tilts over an axis 410 to operate. The automatic focus 255 tilts by employing example embodiments of the invention. It should be understood that example embodiments do not affect the image quality, e.g., shading affects, as the lens or sensor shift solutions. It should be further understood that for a tilting effect there is suspension for the inner camera constructed with upper and lower bias springs.

Figure 5A:
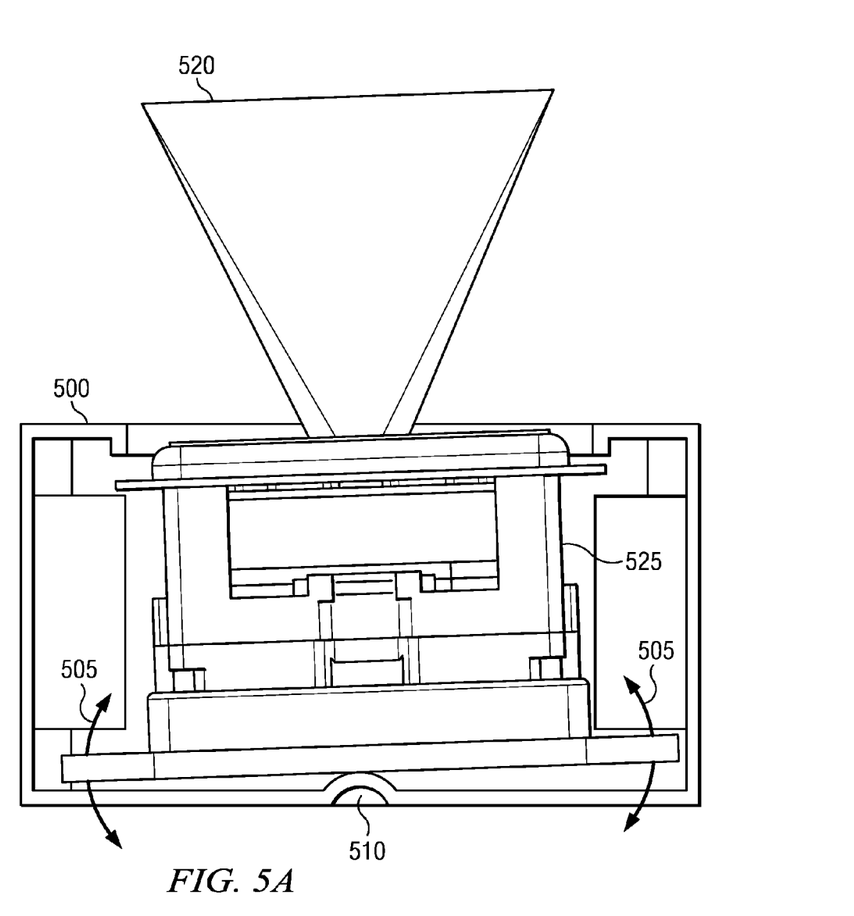
FIG. 5A is block diagram depicting a camera and pivot axis operating in accordance with an example embodiment of the invention.
Figure 5B:
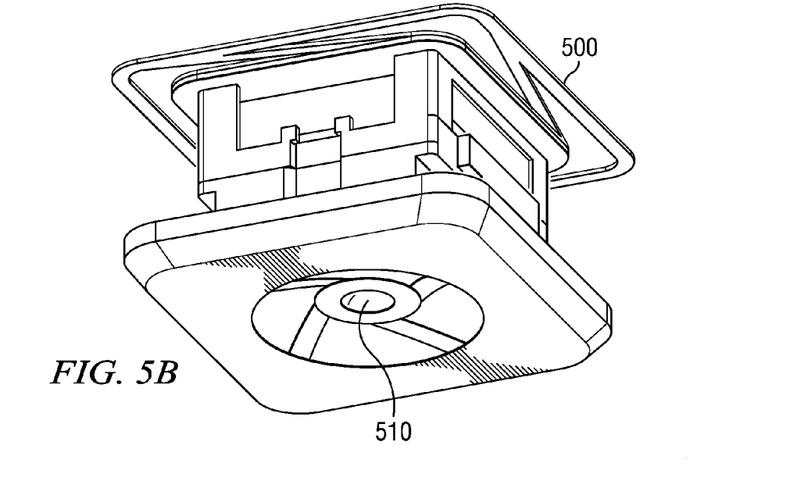
FIG. 5B is a block diagram depicting a camera and gimbal operating in accordance with an example embodiment of the invention.

FIG. 5A is block diagram depicting a camera 500 and pivot axis 510 operating in accordance with an example embodiment of the invention. In an example embodiment, camera 500 is similar to camera 44 of FIG. 1. In an alternative embodiment, camera 500 is different than camera 44 of FIG. 1. In an example embodiment, camera 500 is similar to camera 205 of FIG. 2. In an alternative embodiment, camera 500 is different than camera 205 of FIG. 2.

In an example embodiment, the automatic focus 525 is designed to tilt using a pivot axis 510. In such a case, the pivot axis 510 replaces suspension, such as upper spring and/or lower spring. As such, the automatic focus 525 pivots in an upward and downward manner 505 to adjust a camera focus 520. In an example embodiment, the pivot axis 510 is configured to move an optical imaging stabilizing system, using, for example, one or more coils. In such a case, similar techniques may be employed. It should be understood that the automatic focus 525 and optical imaging stabilizing system may be operating at substantially the same time.

Figure 5C:
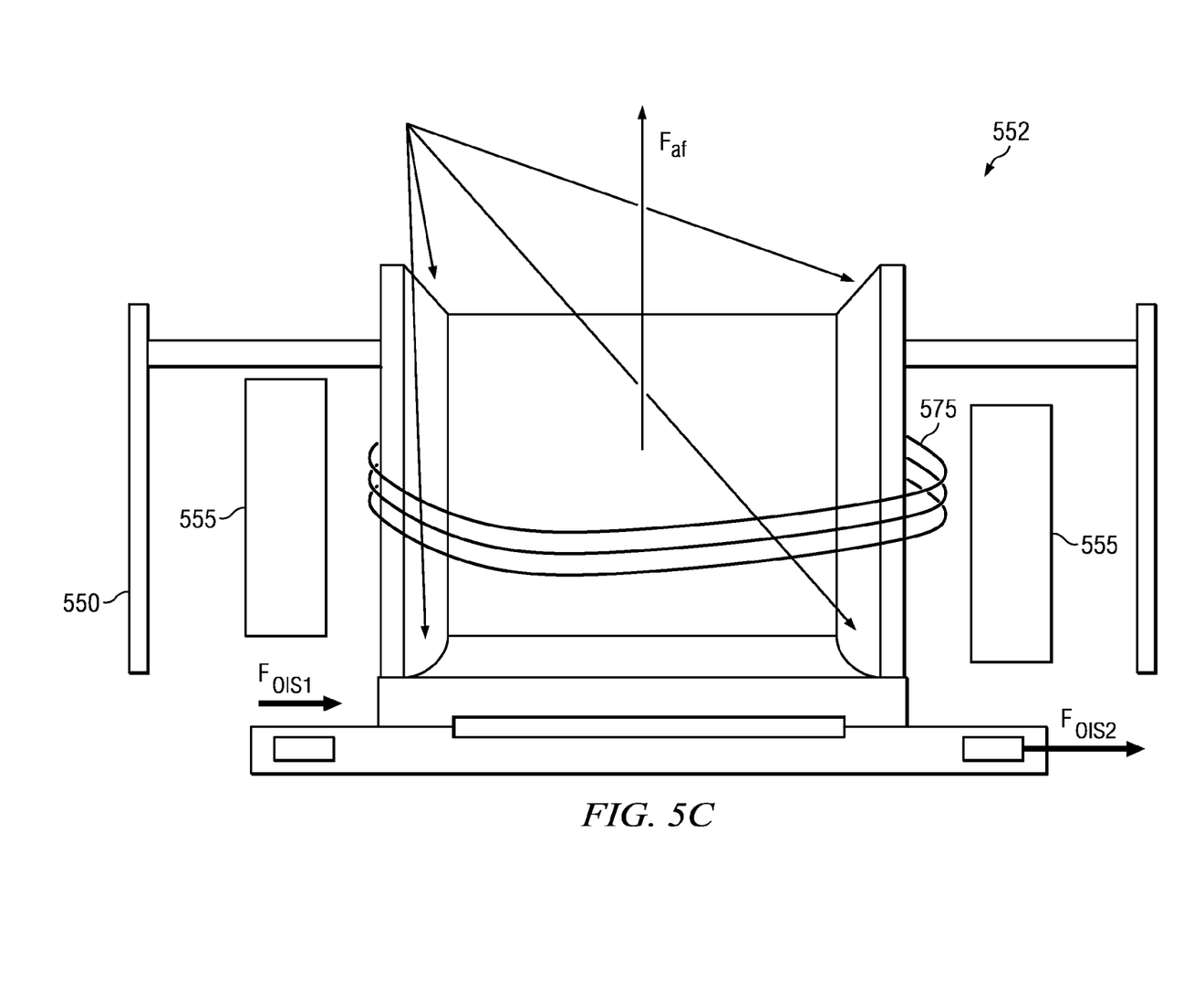
FIG. 5C is a block diagram depicting an automatic focus operating in accordance with an example embodiment of the invention.

FIG. 5C is a block diagram depicting a camera 552 and gimbal 550 operating in accordance with an example embodiment of the invention. In an example embodiment, the magnetic circuitry 555 is configured in a gimbal 550 instead of the pivot axis 510 technique. In an example embodiment, a gimbal 550 is a ring that is suspended so as to rotate about an axis. Further, gimbal 550 may be nested one within another to accommodate rotation about multiple axes. In an embodiment, the gimbal 550 may be a gimbal lock in two dimensions, three dimensions, and/or the like.

In an example embodiment, the gimbal lock in two dimensions may occur in gimbal systems with two degrees of freedom such as a theodolite with rotations about an azimuth and elevation in two dimensions. These systems can gimbal lock at zenith and nadir. Consider tracking a helicopter flying towards the theodolite from the horizon. The theodolite is a telescope mounted on a tripod so that it can move in azimuth and elevation to track the helicopter. The helicopter flies towards the theodolite and is tracked by the telescope in elevation and azimuth. The helicopter flies immediately above the tripod (i.e. it is at zenith) when it changes direction and flies at 90 degrees to its previous course. The telescope cannot track this maneuver as neither of the two motions allows it to follow the target. It is in gimbal lock. So there is an infinity of directions around zenith that the telescope cannot track all movements of a target.

In an example embodiment, a gimbal lock in three dimensions is also possible. Consider a case of a level sensing platform on an aircraft flying due North with its three gimbal 550 axes mutually perpendicular, e.g., roll, pitch, yaw angles each zero, and/or the like. If the aircraft pitches up 90 degrees, the aircraft and platform's Yaw axis gimbal 550 becomes parallel to the Roll axis gimbal 550 and changes about yaw can no longer be compensated for. It should be understood that no gimbal 550 is restrained, as each of the gimbal 550 may rotate freely about their respective axis of suspension. Nevertheless, because of the parallel orientation of both the yaw and roll gimbal 550 axes; there is no axis available to accommodate yaw rotation.

Figure 5D:
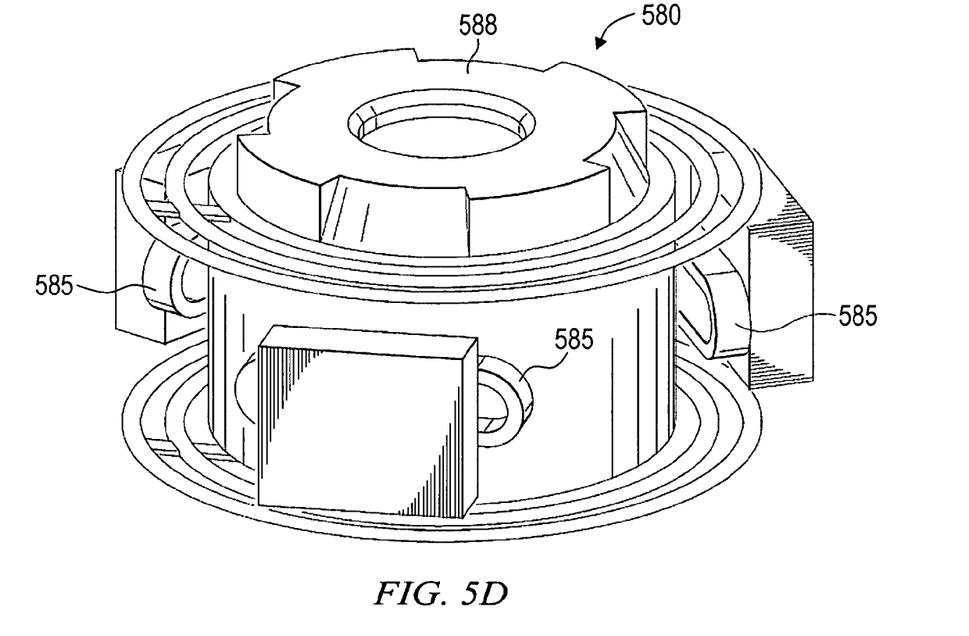
FIG. 5D is a block diagram depicting an automatic focus operating in accordance with an example embodiment of the invention.

FIG. 5D is a block diagram depicting an automatic focus 580 operating in accordance with an example embodiment of the invention. In an example embodiment, the single wire wound automatic focus coil 585 may be replaced by four separate coils on each side. In such a case, the coils are able to control the lens barrel 588 tilt as well when each side of the barrel coils could be controlled independently. Total optical imaging stabilizing system correction range would be barrel tilt plus an apparatus tilt.

In an example embodiment, a double tilt technique may be employed. For example, the lens barrel inside an automatic focus 580 is able to tilt the lens barrel and also move the lens barrel along optical axis. In an embodiment four separate coils, e.g., one on each side, are used. Each coil may be controlled individually using their current control. If there is difference in control current of each coil the lens is lifted, but also tilted. In such a case, tilting corrects the human handshake and lifting performs the autofocusing. In an example embodiment, the total image stabilization is the sum of two tilt components: lens barrel tilt+tilt of optical imaging system. A technical effect is that a larger total tilt is realized, power consumption can be optimized, for example, video may be used as a barrel tilt with a smaller tilt range if that is ok, frequency response is better e.g., faster. Moreover, a smaller power consumption in a zero tilt, e.g., rest position of camera, when optical imaging stabilizing system feature is off.

Figure 6:
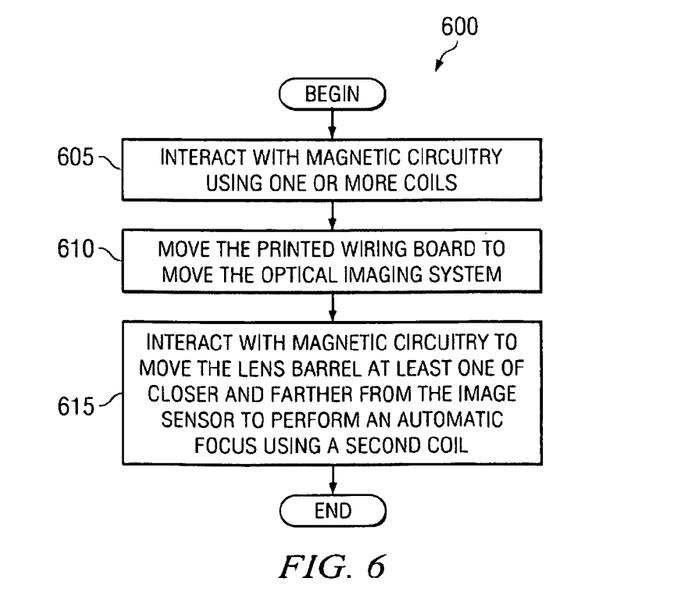
FIG. 6 is flow diagram of an example method operating in accordance with an example embodiment of the invention.

FIG. 6 is flow diagram of an example method 600 operating in accordance with an example embodiment of the invention. Example method 600 may be performed by a camera, such as camera 205 of FIG. 2 or camera 44 of FIG. 1. Further, example method 600 may be performed by an electronic device, such as electronic device 100 of FIG. 1.

At 605, magnetic circuitry is interacted with using one or more coils. In an example embodiment, magnetic circuitry, such as magnetic circuitry 215 of FIG. 2A interacts with one or more coils to move an optical imaging stabilizing system using a coil. In an example embodiment, a coil, such as coil 240 of FIG. 2, is configured to interact with the magnetic circuitry to create a magnetic force.

At 610, printed wiring board is tilted to move the optical imaging stabilizing system using the coil. In an example embodiment, the coil using the magnetic circuitry is designed to tilt the printed wiring board to move the optical imaging stabilizing system. That is, the processing and/or driving circuitry tilts the printed wiring board to adjust the optical imaging stabilizing system. In such a case, the coil interacts with magnetic circuitry to produce magnetic force, to, for example, tilt the printed wiring board.

At 615, a second coil interacts with the magnetic circuitry to move the lens barrel 264 at least one of closer and farther from the image sensor to perform an automatic focus of the automatic focus. In an example embodiment, the second coil is designed to interact with the magnetic circuitry to move the lens barrel, such as lens barrel 264 of FIG. 2A, at least one of closer and farther from the image sensor to perform an automatic focus of am automatic focus, such as automatic focus 250 of FIG. 2A.

Without in any way limiting the scope, interpretation, or application of the claims appearing below, a technical effect of one or more of the example embodiments disclosed herein is a high performance optical stabilization effect which is achieved by tilting the printed wiring board and thereby moving the optical imaging stabilizing system. Another technical effect of one or more of the example embodiments disclosed herein is by using a shared magnetic circuitry to produce magnetic force to move the optical imaging stabilizing system and tilt the automatic focus and as such one skilled in the art may employ the modular structure which from core camera technology without the cost and productional benefit. Another technical effect of one or more of the example embodiments disclosed herein is by using existing technology for operating the automatic focus and/or optical imaging stabilizing system larger optical and/or enhancing lens may be used due to the conservation in space.

Embodiments of the present invention may be implemented in software, hardware, application logic or a combination of software, hardware and application logic. The software, application logic and/or hardware may reside on an electronic device or a camera. If desired, part of the software, application logic and/or hardware may reside on an electronic device, and part of the software, application logic and/or hardware may reside on a camera. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
a first magnetic circuitry comprising a first side and a first end adjacent the first side;
a printed wiring board comprising a first coil and being coupled to an image sensor, wherein the first coil is opposite the first end of the first magnetic circuitry;
the first coil, using the first magnetic circuitry, is configured to tilt the printed wiring board and automatic focus optomechanics, the automatic focus optomechanics being attached to the printed wiring board over at least one of: a pivot point and a tilting axis to operate an optical imaging stabilizing system; and
a second coil configured to interact with the first magnetic circuitry to move a lens barrel at least one of closer and farther from the image sensor to perform an automatic focus, wherein the second coil is opposite the first side of the first magnetic circuitry.

2. The apparatus of claim 1 wherein the first coil comprises fine pitch embedded coils.

3. The apparatus of claim 1 wherein the first coil is adapted to interact with at least one of a flexible printed circuit and a rigid flexible printed circuit.

4. The apparatus of claim 1 wherein the image sensor is at least one of a charge-coupled device and a complementary metal-oxide-semiconductor active-pixel sensor.

5. The apparatus of claim 1 wherein the automatic focus optomechanics tilts based at least in part by interaction with the second coil wound around one or more sides of the lens barrel and the magnetic circuitry.

6. The apparatus of claim 1 wherein the apparatus further comprises suspension, upper spring, and a lower spring adapted to tilt the automatic focus optomechanics.

7. The apparatus of claim 1 further comprising a pivot axis to tilt the automatic focus optomechanics.

8. The apparatus of claim 1 further comprising a pivot axis to move the optical imaging stabilizing system.

9. The apparatus of claim 1 wherein the printed wiring board is a camera printed wiring board.

10. The apparatus of claim 1 wherein the apparatus is at least one of a camera and electronic device.

11. A method, comprising;
interacting with a first magnetic circuitry using one or more coils, wherein the first magnetic circuitry comprises a first side and a first end adjacent the first side, and wherein a first one of the one or more coils is opposite the first end of the first magnetic circuitry;
moving the printed wiring board to move the optical imaging stabilizing system using the first magnetic circuitry;
interacting with the first magnetic circuitry using a second coil, wherein the second coil is opposite the first side of the first magnetic circuitry; and
moving a lens barrel to perform an automatic focus using the first magnetic circuitry.

12. The method of claim 11 wherein the one or more coils comprises fine pitch embedded coils.

13. The method of claim 11 further comprising interacting with at least one of a flexible printed circuit and a rigid flexible printed circuit with the one or more coils.

14. The method of claim 11 wherein the image sensor is at least one of a charge-coupled device and a complementary metal-oxide-semiconductor active-pixel sensor.

15. The method of claim 11 further comprising tilting automatic focus optomechanics based at least in part by interaction with the second coil wound around one or more sides of the lens barrel and the magnetic circuitry.

16. The method of claim 11 further comprising tilting automatic focus optomechanics using at least one of suspension, upper spring, and lower spring.

17. The method of claim 11 further comprising tilting automatic focus optomechanics using a pivot axis.

18. The method of claim 11 further comprising tilting the optical imaging stabilizing system using a pivot axis.

19. The method of claim 11 further comprising integrating the one or more coils in a printed wiring board.

20. The method of claim 11 wherein the apparatus is at least one of a camera and electronic device.

* * * * *